(12) United States Patent
Hepner et al.

(10) Patent No.: US 7,185,006 B2
(45) Date of Patent: Feb. 27, 2007

(54) METHOD AND APPARATUS FOR REDUCING THE SCOPE OF QUERIES THAT SEEK INFORMATION FROM NETWORKED COMPUTERS

(75) Inventors: Daniel W. Hepner, Saratoga, CA (US); Morris Lee, Sunnyvale, CA (US); Eric M. Soderberg, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 10/251,876

(22) Filed: Sep. 23, 2002

(65) Prior Publication Data

US 2004/0059702 A1 Mar. 25, 2004

(51) Int. Cl.
  *G06F 17/30* (2006.01)
(52) U.S. Cl. ......................................................... 707/4
(58) Field of Classification Search .................... 707/1, 707/2, 10, 200, 4; 370/254
See application file for complete search history.

(56) References Cited

U.S. PATENT DOCUMENTS

| | | | | |
|---|---|---|---|---|
| 5,943,666 A | * | 8/1999 | Kleewein et al. | 707/2 |
| 6,064,656 A | * | 5/2000 | Angal et al. | 370/254 |
| 6,112,206 A | * | 8/2000 | Morris et al. | 707/10 |
| 6,542,964 B1 | * | 4/2003 | Scharber | 711/122 |
| 6,633,312 B1 | * | 10/2003 | Rochford et al. | 715/736 |
| 6,633,873 B1 | * | 10/2003 | Nakamura | 707/10 |
| 2002/0194260 A1 | * | 12/2002 | Headley et al. | 709/203 |
| 2003/0115065 A1 | * | 6/2003 | Kakivaya et al. | 704/270.1 |

* cited by examiner

*Primary Examiner*—Etienne P. LeRoux

(57) ABSTRACT

A system and method for handling a query seeking information about computers of a network, where the query can be optimized in a way which limits the set of computers examined to a set smaller than all known computers. The query is examined to determine a limited list of computers to be accessed that would yield the complete result. If the query can be satisfied using data from a number of computers which is less than all of the computers in the network, then the number of computers which is less than all of the computers in the network is accessed to satisfy the query. In this manner, the data collection process for satisfying the query is generally more efficient than accessing all of the computers in the network.

10 Claims, 7 Drawing Sheets

METHOD AND APPARATUS FOR REDUCING THE SCOPE OF QUERIES THAT SEEK INFORMATION FROM NETWORKED COMPUTERS

TECHNICAL FIELD

This invention relates, in general, to the processing of queries of networked computers, and more particularly, to the handling of SQL-type queries relating to administration, monitoring, configuration or other functions relating to computers in one or more networks.

BACKGROUND

Computers are often arranged in various network configurations so as to facilitate communications and resource sharing between the computers. For instance, computers are typically arranged in a local area network (LAN), and may be organized in a group or cluster. A corporation may arrange its network according to functional units of the corporation—such as a cluster for management, a cluster for engineering, a cluster for marketing, etc., or the networked computers may be arranged using a variety of other schemes.

Typically, one or more computers in a network has the capability to perform administrative functions to maintain the network and the computers thereof. Administration functions may include monitoring functions, configuration functions, or other functions needed for the administration of the network. Such function may require collection of data—using a client application program—about one or more computers in the network.

Referring to FIG. 1, an example of a computer network 10 is illustrated, wherein a plurality of computers are interconnected by a network connection 12. The network includes multiple clusters 14 of computers, wherein each cluster contains one or more computers therein. As shown in FIG. 1, one of the computers 16 performs administrative functions for the network, which as mentioned above, may include monitoring, configuring, or administering the network. It is understood that the network of FIG. 1 can be arranged in a variety of different ways, and FIG. 1 merely shows one example of a network configuration.

In the administration of the network of FIG. 1, the computer 16 responsible for the network administration may, from time to time, require data from one or more of the computers within the network 10, wherein the data required should satisfy a specified criteria. Collecting data from many computers can be very time consuming, particularly where the network 10 is a complex network with a large number of computers. Where a system administrator's computer 16 queries the computers in the network 10 for data, a prompt response to the query is desirable as recognized by the present inventors.

With some administrative interfaces, queries which are un-optimized would likely operate on all of the computers in the network, which thereby generates requests to and responses from all of the computers in the network and from which all the returned data is examined to determine if any of the data satisfies the query. Such a process can be very time consuming, particularly in a large computer network.

As recognized by the present inventors, what is needed is a method for handling queries relating to the administration or monitoring of network computers in a manner which efficiently reduces the scope of the query and accesses computers in the network which are likely to have the data of interest.

It is against this background that various embodiments of the present invention were developed.

SUMMARY

In light of the above and according to one broad aspect of one embodiment of the invention, disclosed herein is a system and method for handling a query seeking information about computers of a network, where the query can be optimized in a way which limits the set of computers examined to a set smaller than all known computers. The query is examined to determine a limited list of computers to be accessed that would yield the complete result. If the query can be satisfied using data from a number of computers which is less than all of the computers in the network, then the number of computers which is less than all of the computers in the network is accessed to satisfy the query. In this manner, the data collection process for satisfying the query is generally more efficient than accessing all of the computers in the network.

According to another broad aspect of the invention, disclosed herein is a system and method for reducing the scope of a query seeking information about computers of a network where the query specifies one or more computers. The reduction includes examining the query to determine the one or more computers specified in the query, and determining if the query can be satisfied using data from a number of computers which is less than all of the computers in the network. If the query can be satisfied using data from the number of computers which is less than all of the computers in the network, then the number of computers which is less than all of the computers in the network is accessed. In one embodiment, the query is a SQL query, and for each of the one or more computers specified in the query, the reduction examines whether the computer belongs to a group of computers, and if so, including the group of computers in the accessing operation.

According to another broad aspect of the invention, disclosed herein is a system and method for handling a SQL-type query seeking information about computers of a network, the SQL-type query specifying as operands one or more computers or groups of computers. The method includes forming a list of computers of the network, the list specifying names of groups of computers and the members of each group; examining the operands of the query; forming a limited list of computers to access in order to satisfy the query, the limited list containing a number of computers that is less than all of the computers in the network; and obtaining data from the computers in the limited list. In one embodiment, the operation of forming a list of computers includes discovering each computer which is operating in the network; for each computer operating in the network, determining if the computer is a member of a group; and forming the list to include the names of groups of computers and the members of each group. The network is monitored to determine if the network changes, and if so, the list is updated to reflect the computers operating in the network.

According to another broad aspect of the invention, disclosed herein is a system and method for processing a query specifying one or more computers of a network. The method includes receiving the query from a client application, and forming a limited list of computers to be accessed to satisfy the query, the limited list specifying less than all of the computers in the network. Data is obtained from the computers specified in the limited list, and the obtained data is filtered to determine if any of the obtained data satisfies the query, and if so, the matching data is returned to the client application. The data collection process for satisfying the query is generally more efficient than accessing all of the computers in the network.

In one embodiment, the operation of forming a limited list includes for each of the one or more computers specified in the query, examining whether the computer belongs to a group of computers, and if so, including the group of computers in the limited list and expanding the limited list to include all of the computers that are members of the group of computers. In another embodiment, the operation of forming a limited list includes forming a list of computers of the network, the list specifying names of groups of computers and the members of each group.

The foregoing and other features, utilities and advantages of the invention will be apparent from the following more particular description of various embodiments of the invention as illustrated in the accompanying drawings and claims.

DETAILED DESCRIPTION

In accordance with various embodiments of the present invention, disclosed herein is a method for handling queries relating to networked computers. As used herein, a query specifies, as operands of the query, one or more computers and/or group(s) of computers, a particular criteria (i.e., condition or relationship), and further may specify data fields needed, in one embodiment. As used herein, the term "computer" is intended to include computers or any other device operating on a network, wired or wireless (such as addressable devices, peripherals, servers, virtual machines, appliances, PDAs, addressable software entities, or any other computing device connected with the network).

In general, a client application submits a query (i.e., a SQL or "structured query language" query using SQL constructs) relating to the administration, monitoring, or configuring of one or more computers in the network. The query is submitted to a SQL engine for processing, and the SQL engine passes the query to a scope-optimizing module to determine if the query can be satisfied by accessing less than all the computers in the network. If so, the scope optimizing module returns a limited list of computers (i.e., a list which specifies less than all of the computers in the network) to the SQL engine, and the SQL engine uses the limited list to collect data from computers in the network. The SQL engine returns to the client application the relevant results of the data collected.

Figure 1:
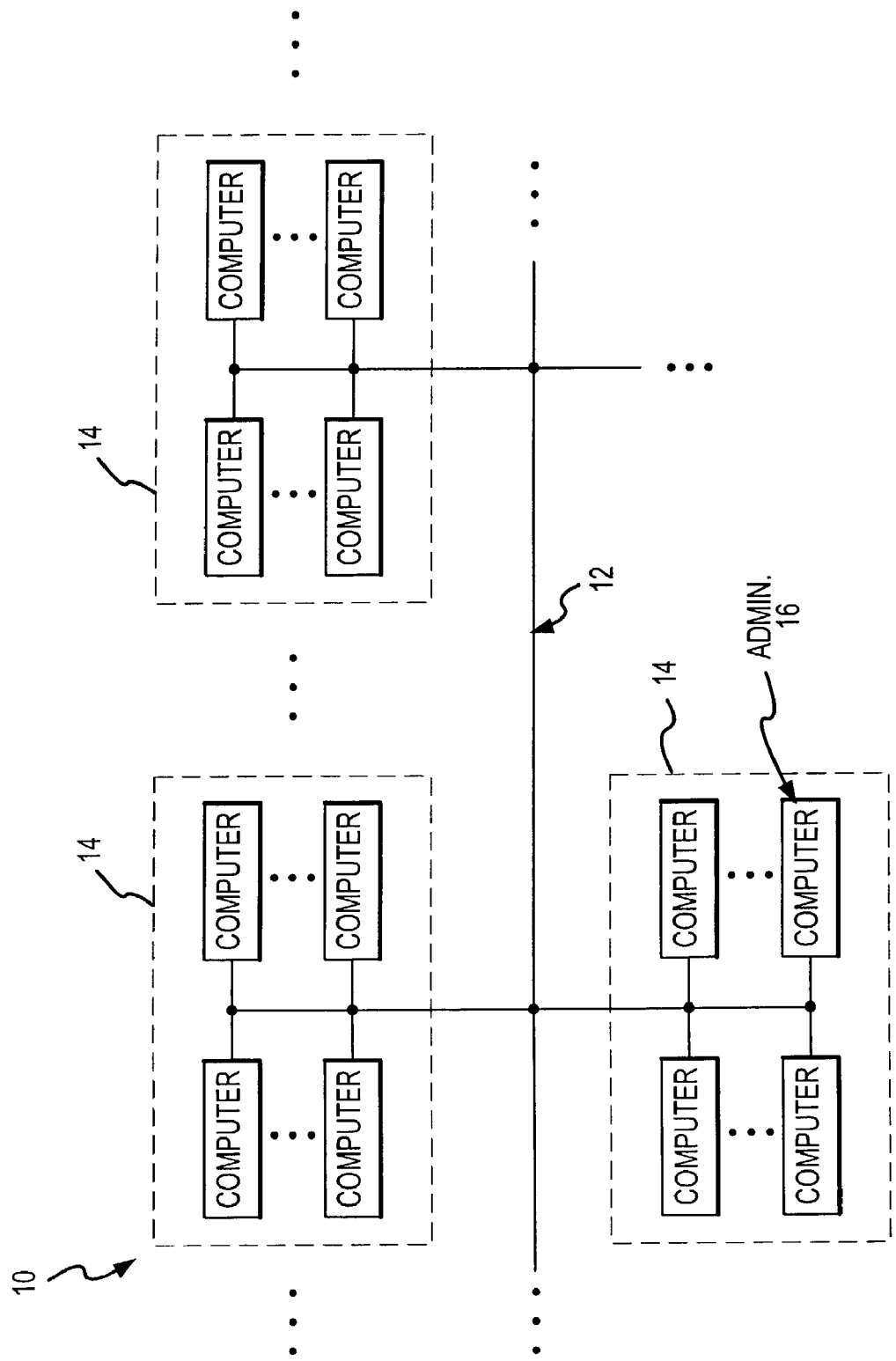
FIG. 1 illustrates an example of a computer network with a particular computer configured to perform administrative, monitoring, or configuration functions relating to the network.

Generally, the administrative computer 16 of FIG. 1 hosts the client application, the SQL engine, the scope-optimizing module, and a list of all the computers in the network. The administrative computer 16 queries the other computers 14 in the network. However, the various functions of the administrative computer 16 may be hosted by several different computers, rather than residing on only one computer. Also, the software for executing the administrative functions of the administrative computer 16 may reside on the hard disk of the administrative computer 16, or may reside on a computer readable medium such as a floppy disk, CD- or DVD-ROM disk, or other medium.

Figure 2:
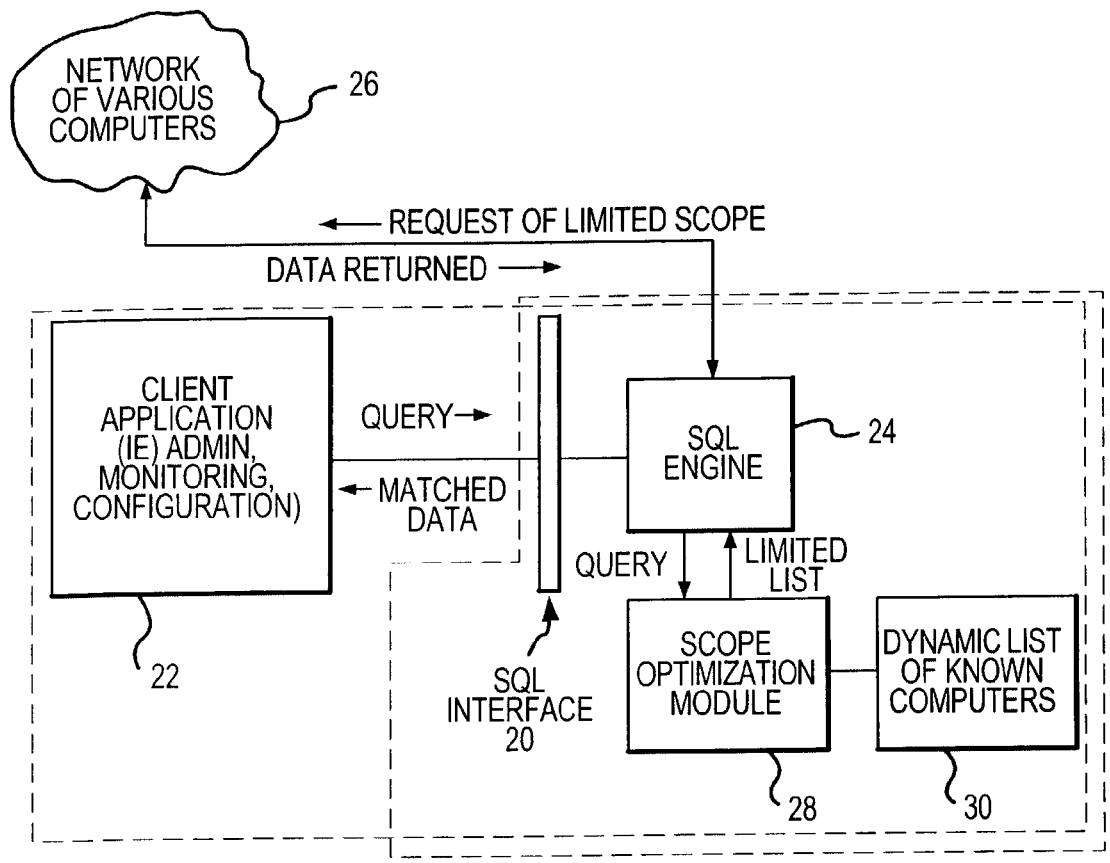
FIG. 2 illustrates a block diagram of an interface, a SQL engine, and a scope optimization module, in accordance with one embodiment of the present invention.

With reference to FIG. 2, a block diagram of one embodiment of the present invention is illustrated. An interface 20 is provided between a client application 22 and a SQL engine 24, wherein the interface is a software interface providing various command formats which the client application 22 can utilize to obtain particular data about one or more computers in the network 26, for purposes such as administering, monitoring, or configuring the network, computers, or other components thereof.

The client application 22, in one embodiment, contains one or more administrative, monitoring, or configuration functions which the client application desires to perform. Generally, the client application 22 is a software program which, during an operation of the software, requires information from one or more computers in the network, and in one example, this information relates to administration, monitoring, or configuration of the one or more computers or other devices in the network.

In accordance with one embodiment of the present invention, the interface 20 is a SQL-type interface supporting SQL-type command constructs for performing operations relating to administering, monitoring, or configuring one or more computers or other components in the network. Other command constructs can be used as desired. By using a SQL-type interface at interface 20, queries or commands typically used in database environments are applied in a non-database environment for performing administration, monitoring, or configuration operations, thereby providing the user of the client application with a familiar command syntax and structure. Examples of SQL queries and their constructs are described in "Understanding the New SQL: a Complete Guide" by Jim Melton and Alan R. Simon (Morgan Kaufmann Publishers, 1993), which is incorporated herein by reference in its entirety.

The SQL engine 24, in general, collects data from computers in the network 26 using a list of computers to be accessed. As discussed below, the list of computers to be accessed may be limited by the scope optimization module. Once the SQL engine 24 has the list of computers to access, the SQL engine 24 queries those computers in the list, and the SQL engine examines the data returned to determine if it matches the criteria specified by the client application. If so, the SQL engine 24 returns the matched data to the client application 22.

For instance as shown in FIG. 2, the SQL engine 24 accesses the network of various computers 26 with requests for data from a limited list of computers, wherein the content of the limited list of computers is based upon the results obtained from the scope optimization module 28. The SQL engine 24, upon receiving data returned from the computers 26, applies certain criteria to the returned data to determine whether any of the returned data matches or satisfies the particular criteria. The SQL engine 24 returns to the client application any matched data which satisfies the criteria.

Figure 5A:
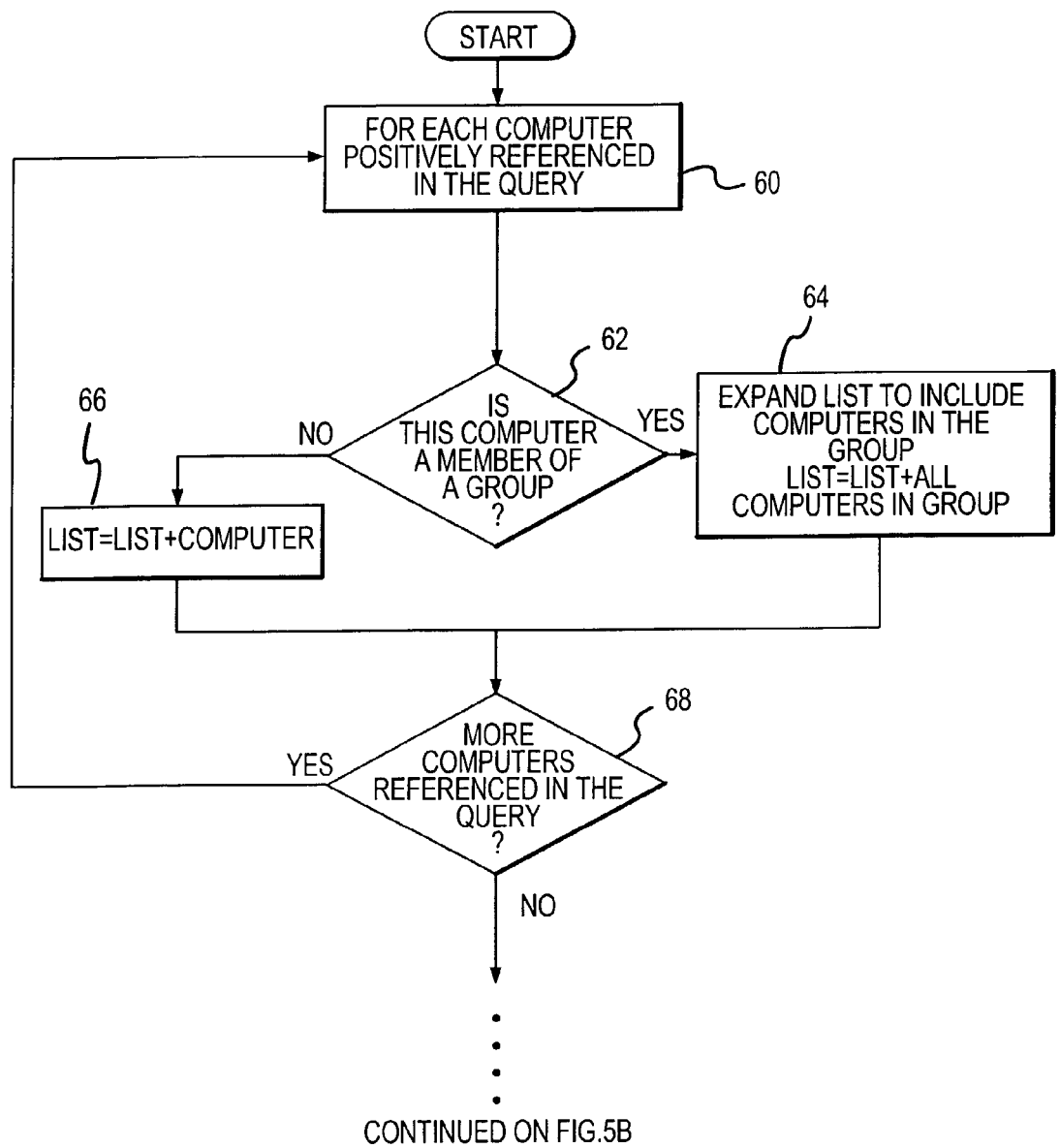
FIGS. 5A and 5B illustrate one example of the logical operations for forming a limited list of computers to be accessed in order to satisfy a query based on the content of the query, in accordance with one embodiment of the present invention.
Figure 5B:
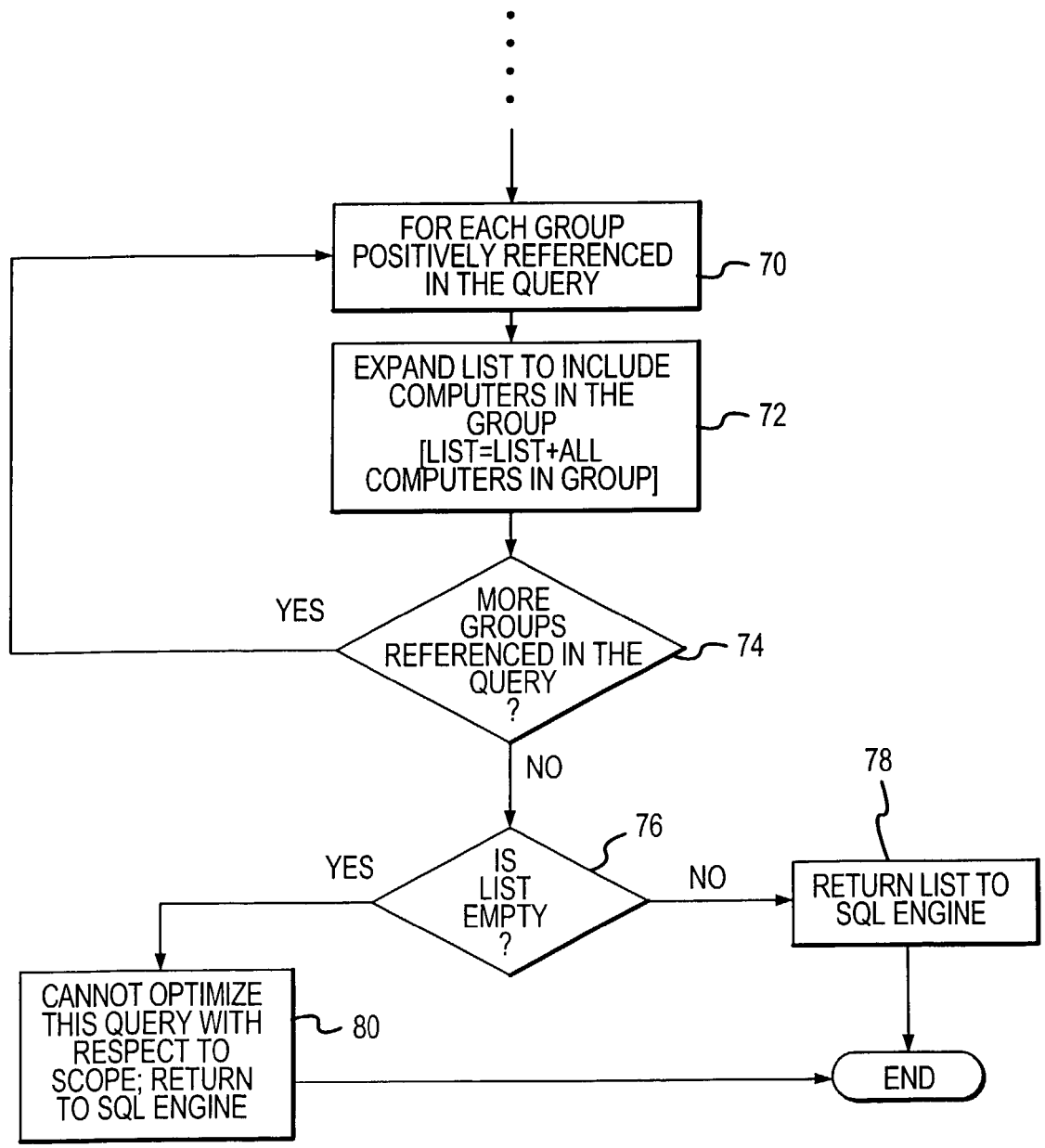

The scope optimization module 28 performs an optimization of a query as to the scope of the query, in accordance with various embodiments of the present invention. In one example, the scope optimization module receives the query (or portions thereof) from the SQL engine and the scope optimization module 28 determines whether the query can be satisfied by collecting data from less than a complete set of computers in the network 26. If so, the scope optimization module 28 optimizes the query as to scope by passing to the SQL engine a limited list of computers to be accessed by the SQL engine in order to satisfy the query. In this manner, the scope optimization module 28 provides an optimized or limited scope of a query, based on or derived from the query itself, in accordance with embodiments of the present invention. FIGS. 5A–5B, described below, illustrate one example of the logical operations for forming a limited list of computers, in accordance with one embodiment of the present invention.

Figure 6:
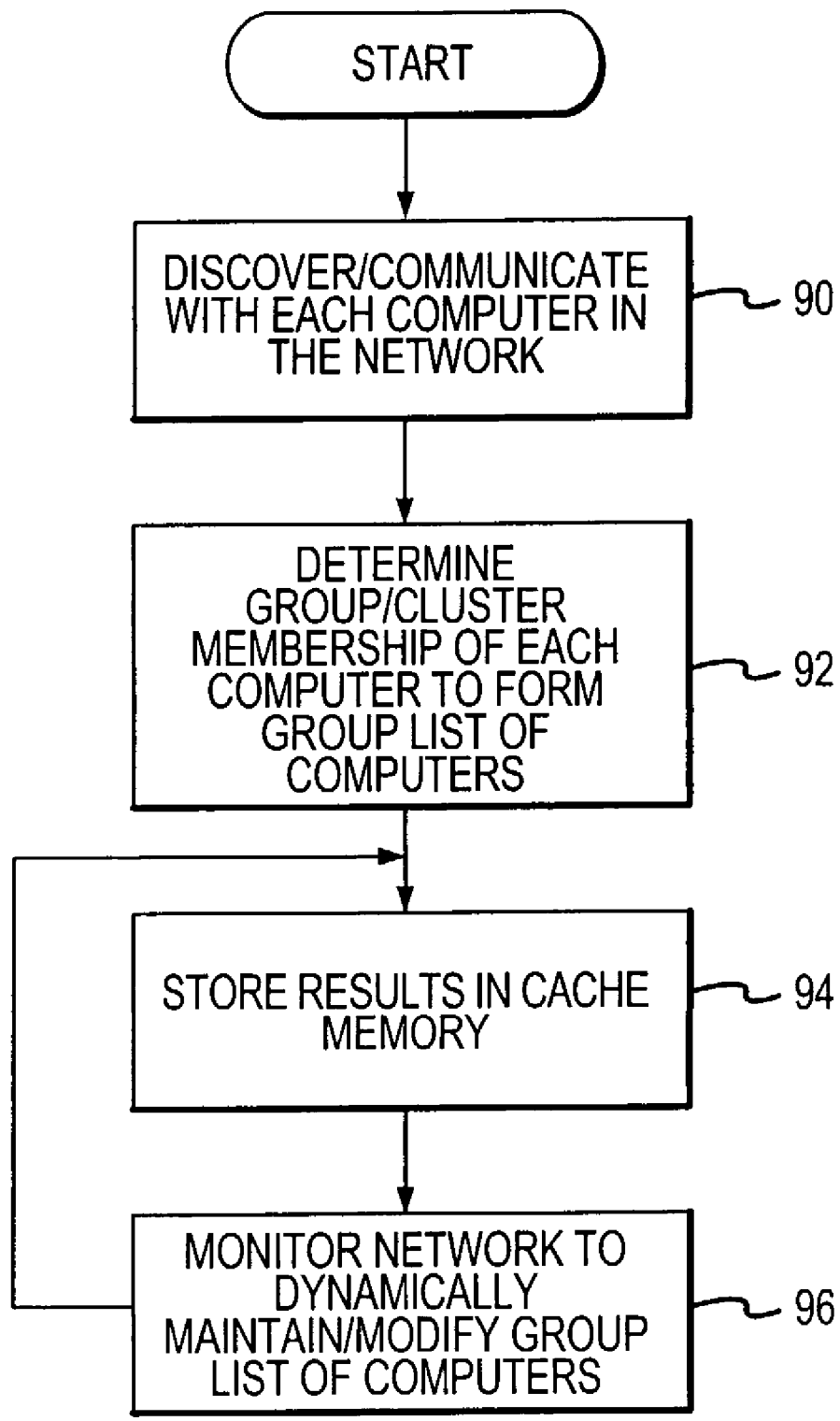
FIG. 6 illustrates one example of the logical operations for maintaining a dynamic list of computers of a network, in accordance with one embodiment of the present invention.

As shown in FIG. 2, the scope optimization module 28 maintains a dynamic list 30 of known computers in the computer network 26. The dynamic list 30 includes, in one embodiment, a list of "groups" of computers and the computers which are members of each group. For instance, assume a computer network has 150 computers divided into three groups ("Management," "Marketing," and "Engineering") wherein the Management group includes 25 computers, the Marketing group includes 45 computers, and the Engineering group includes 80 computers. In this example, the dynamic list 30 of known computers shown in FIG. 2 would include three groups of computers—the 25 computers which are members of the Management group/cluster, the 45 computers which are members of the Marketing group/cluster, and the 80 computers which are members of the Engineering group/cluster. As will be described below, the scope optimization module 28 utilizes the dynamic list 30 of known computers in order to form the limited list of computers to pass to the SQL engine 24. In one embodiment, the dynamic list 30 is stored in a cache and continuously updated. FIG. 6, described below, illustrates one example of the logical operations for updating the list 30 of computers in a dynamic fashion in accordance with one embodiment of the present invention.

As shown in FIG. 2, the various modules may be hosted on a single computer, or may be hosted on separate computers. For example, the client application 22 may be hosted on a separate computer, and the SQL interface 20, the SQL engine 24, the scope optimization module 28 and the dynamic list of known computers 30 may be hosted together on a single computer. Alternately, the client application 22, the SQL interface 20, the SQL engine 24, the scope optimization module 28 and the dynamic list of known computers 30 may all be hosted on a single computer.

In one overall operation and referring to FIG. 2, the client application 22 lodges a query for data relating to one or more computers in the network 26, using a command of the SQL interface 20. The command is passed through the SQL interface 20 to the SQL engine 24, wherein the SQL engine 24 passes the query (or portion thereof) to the scope optimization module 28 to determine if the query can be satisfied by collecting data from less than the complete set of computers. The scope optimization module 28 then examines the query and determines whether the query can be satisfied by collecting data from less than a complete set of computers. The scope optimization module 28 makes this determination based on the query itself and by accessing the dynamic list 30 of groups of known computers. The scope optimization module 28 returns a limited list of computers that are to be accessed to satisfy the query, and passes this limited list to the SQL engine 24. The SQL engine 24 then formulates its query to the network 26 of various computers, wherein the query or request may be of a scope less than the entire network, based upon the limited list provided by the scope optimization module 28. In this manner, the SQL engine 24 may request data from less than the complete set of computers in the network, thereby making the request process and subsequent data processing more efficient.

The data returned from the various computers queried by the SQL engine 24 is then examined by the SQL engine 24 to determine if any of the data matches the criteria specified by the client application's query, and if so, the matched data is passed from the SQL engine 24 to the client application 22.

Figure 3:
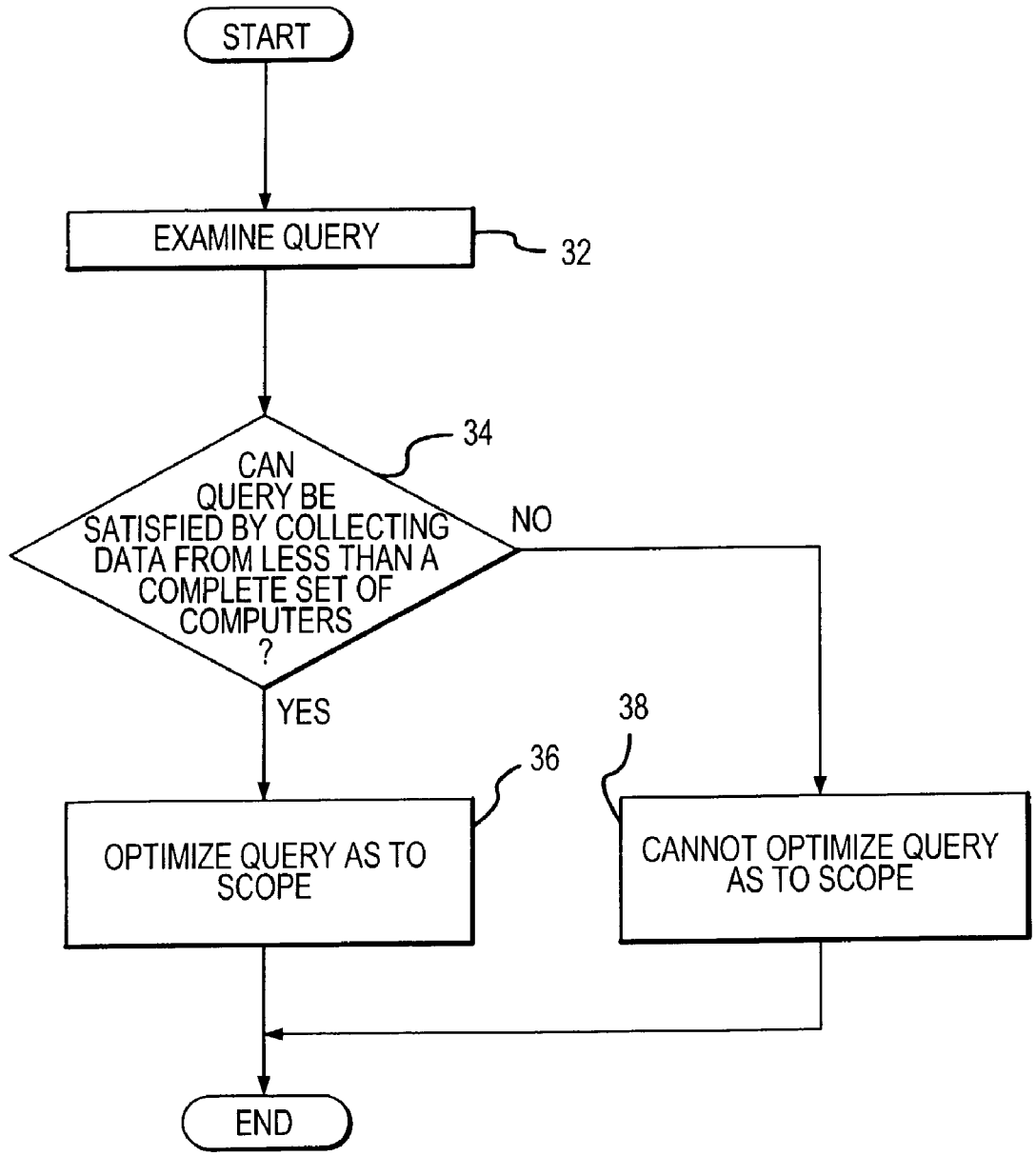
FIG. 3 illustrates one example of the logical operations for handling a query, in accordance with one embodiment of the present invention.

FIG. 3 illustrates one example of the logical operations for optimizing a query, in accordance with one embodiment of the present invention. At operation 32, a query (i.e., from a client application) is received and examined to determine if a derived limitation on the scope of the query can be made. Decision operation 34 determines whether the query can be satisfied using data from less than the complete set of computers of the network. Decision operation 34 is implemented by examining the query to make this determination, and if it can be predicted or determined that certain computers will not have the requested data, then the scope of the query can be limited to less than a complete set of computers in the network—which thereby makes the overall data collection process more efficient. If decision operation 34 determines that the query can be satisfied by collecting data from less than a complete set of computers, then control is passed to operation 36. At operation 36, the scope of the query is reduced, limited or optimized, and in one embodiment the data collected by the query spans less than a complete set of computers in the network if the query can be satisfied in this manner.

If, however, decision operation 34 determines that the query cannot be satisfied by using data from less than a complete set of computers in the network, then control is passed to operation 38, wherein it is indicated that the query cannot be optimized as to scope. Accordingly, it can be seen that the logical operations of FIG. 3 can reduce or optimize a query as to scope by examining the query and determining whether the query can be satisfied by collecting data from less than a complete set of computers.

Figure 4:
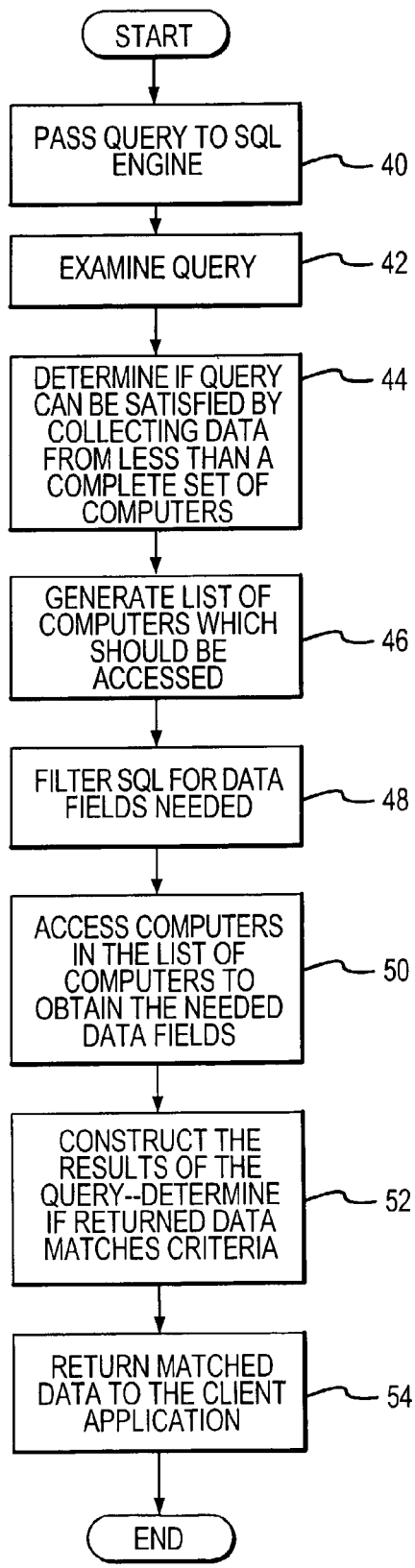
FIG. 4 illustrates one example of the logical operations for handling a query, in accordance with one embodiment of the present invention.

Referring now to FIG. 4, one example of the logical operations for handling a query is illustrated. At operation 40, the query (i.e., from a client application) is passed to the SQL engine 24. The query specifies one or more computers, and/or one or more groups of computers, a particular criteria (i.e., condition or relationship), and further may specify data fields needed, in one embodiment. At operation 42, the query is examined as to its command and its operands. In one embodiment, the query is passed from the SQL engine 24 to the scope optimization module 28, and the scope optimization module 28 examines the query including the computers or groups of computers specified in the query.

At operation 44, a determination is made if the query can be satisfied by collecting data from less than a complete set of computers. In one embodiment, operation 44 is performed by the scope optimization module 28 which examines the query to make such a determination. Assuming that the query can be satisfied by collecting data from less than a complete set of computers in the network, then operation 46 generates a limited list of computers which should be accessed, or from which data should be collected, in order to satisfy the query. In one embodiment, the limited list of computers is generated by the scope optimization module 28 according to the logical operation of FIGS. 5A–5B, and the limited list is passed to the SQL engine 24 for use therein.

At operation 48, the query is filtered for data fields needed in order to satisfy the query. In one embodiment, the SQL engine 24 performs this operation and formulates the necessary commands and operands needed to obtain the required data from the computers in the limited list provided at operation 46.

At operation 50, the computers in the limited list provided at operation 46 are accessed to obtain the needed data fields. In one embodiment, operation 50 is performed by the SQL engine 24 by accessing or communicating with the various computers listed in the limited list provided by operation 46. In response to operation 50, the computers accessed by operation 50 generate data and return this data to the SQL engine 24 as requested.

At operation 52, the results of the query are constructed, such as by determining if the returned data from the computers accessed at operation 50 matches the particular criteria of the query. In one embodiment, operation 52 is performed by the SQL engine 24 based on the received data returned from the one or more computers accessed at operation 50. The SQL engine 24 sorts or processes the data returned to determine if any of the returned data matches the criteria.

At operation 54, any data which matches the criteria is passed to or reported to the client application for processing by the client application. Therefore, it can be seen that the operations of FIG. 4 can satisfy the client application's request for data about one or more of the computers in the network without having to access each of the computers in the network in order to satisfy the query.

It is understood that some queries may require access to more computers in the network than do other queries, as the number of computers accessed by a query are dependent upon the particular query provided by the client application. For instance, consider the example 150 computer network discussed above, and a query which requests an identification of all printers available to a particular computer. Such a query may read as follows:

"SELECT FROM Printers, WHERE Printer IS AVAILABLE TO Jim's Computer."

Assuming that "Jim's Computer" is in a group, and only printers of this group are available to computers of the group, an un-optimized query would place a request to all computers and get data from all computers relating to the printers connected thereto. The results from all of the computers would need to be sorted to determine which printers are available to "Jim's Computer." However, in accordance with the present invention, an optimized query would access "Jim's Computer" as well as, in one embodiment, the group of computers to which "Jim's Computer" belongs (i.e., the Engineering group) in order to satisfy the query.

FIGS. 5A–5B illustrate one example of the logical operations for optimizing the query as to scope, in accordance with one embodiment of the present invention. The operations of FIGS. 5A–5B will return a limited list of computers to the SQL engine 24 so that the SQL engine 24 can access the computers listed in order to satisfy the client application's requests for data. As discussed below, the limited list will include a listing of computers which are to be accessed by the SQL engine 24 in order to satisfy the query. In one embodiment, the limited list is created, in an iterative manner, based upon the operands of the query.

At operation 60 of FIG. 5A, when the query is examined, the query may contain references to either computers and/or groups of computers, as mentioned above. For each computer positively referenced in the query, a set of operations 62–68 are performed iteratively for each computer positively referenced in the query. At decision operation 62, for a particular computer referenced in the query, decision operation 62 determines whether the computer positively referenced in the query is a member of a group of computers. In one embodiment, decision operation 62 is performed by accessing a dynamic list of known computers (see FIG. 2) which is maintained by the scope optimization module 28. The scope optimization module 28 looks up the computer positively referenced in the query by accessing the list of known computers, and if the computer positively referenced in the query is a member of a group in the dynamic list, then control is passed to operation 64.

At operation 64, the limited list is created or expanded to include computers that are in the same group as the computer positively referenced in the query as determined by operation 62. For instance, in referring to the example discussed above, if "Jim's Computer" is referenced in the query, and "Jim's Computer" is a member of the "Engineering" group, then at operation 64, the limited list of computers to be returned to the SQL engine 24 includes (at least) "Jim's Computer" and all of the other computers in the "Engineering" group, in one embodiment.

However, if the computer positively referenced is not a member of a group in the dynamic list as determined by operation 62, then control is passed to operation 66, wherein the limited list includes the computer positively referenced in the query. For instance, if "Greg's Computer" is not a member of either the "Engineering" group, "Management" group, or "Marketing" group, then the limited list at operation 66 would merely contain "Greg's Computer" (plus any elements already in the list at this stage of the process).

At operation 68, if there are more computers referenced in the query, then control is passed to operation 60 so that operations 62–68 are performed iteratively for all computers positively referenced in the query. Accordingly, it can be seen that the limited list can grow to include multiple computers and/or multiple groups of computers, or may include only one computer—as the contents of the limited list will depend upon the operands of the query and the groups or clusters in the computer network.

For example, assume that a query positively recites "Jim's Computer" and "Ann's Computer" (and Ann's computer is a member of the "Management" group), then operations 60–68 will form a limited list that will include all of the computers from the Engineering group (80 computers in this example) as well as all of the computers in the Management group (25 computers in this example), thereby making the limited list of computers to include 105 computers of the total possible 150 computers in the network.

Upon completion of operations 60–68 for each computer positively referenced in the query, then operations 70–74 are performed iteratively to add "groups" of computers which are positively referenced in the query, to the limited list.

For each group positively referenced in the query (operation 70), operation 72 expands the limited list of computers to include the computers which are members of the group positively referenced in the query. For example, if a query specified "Jim's Computer" (a member of the "Engineering"

group) and also specified the "Marketing" group, then at operation 72, the limited list of computers would include all of the computers in the "Engineering" group (by virtue of specifying "Jim's Computer" and operation 64) and the limited list would also include all of the computers in the "Marketing" group.

Decision operation 74 determines whether there are more groups referenced in the query and if so, control is passed to operation 70 so that operation 70–74 can be performed iteratively until all groups positively referenced in the query have been processed.

Having processed all of the computers and groups positively referenced in the query, operation 76 examines the limited list of computers to be returned to the SQL engine 24. If decision operation 76 determines that the list is empty, then operation 80 indicates to the SQL engine 24 that this query cannot be optimized with respect to scope, so that the SQL engine 24 may be required to access all computers in the network in order to satisfy the query. If decision operation 76 determines the limited list is not empty, then operation 78 returns the limited list to the SQL engine 24 so that the SQL engine can access the computers in the limited list to collect data from these computers to satisfy the client application's query. As mentioned above, the limited list may include less than all of the computers in the network, depending on the nature and operands of the particular query.

Referring now to FIG. 6, FIG. 6 illustrates one example of logical operations for updating or maintaining a dynamic list of known computers, in accordance with one embodiment of the present invention. The operations of FIG. 6 may, in one embodiment, be performed as a background process by the scope optimization module 28.

At operation 90, each computer in the network is discovered or communicated with so that its existence can be tracked. For instance, as each of the 150 computers in the example network are initialized, the scope optimization module 28 may obtain (actively or passively) information from each computer as to whether it is a member of the "Management" group, the "Marketing" group, or the "Engineering" group. The scope optimization module 28 would then store this membership information in the dynamic list of known computers 30—for access at a later time when processing a query, as discussed above.

At operation 92, for each computer which has been discovered or its existence is known in the network, the group or cluster membership of the computer is determined, and a dynamic list is formed. In one example, the dynamic list specifies one or more groups, and for each group in the dynamic list, the dynamic list specifies which computers belong to which group. Operation 94 stores the results of the dynamic list in memory, such as a cache memory in one embodiment, so that the dynamic list can be quickly accessed. Operation 96 monitors the network so that the dynamic list of computers can be modified as needed when the members of the groups change. Operation 94 stores the dynamic list as modified in the memory.

Accordingly, it can be seen that, depending on the particular query, embodiments of the present invention provide for satisfying a query from a client application without having to access all of the computers in the network.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

The foregoing embodiments and examples are to be considered illustrative, rather than restrictive of the invention, and those modifications, which come within the meaning and range of equivalence of the claims, are to be included therein. While the invention has been particularly shown and described with reference to a preferred embodiment thereof, it will be understood by those skilled in the art that various other changes in the form and details may be made without departing from the spirit and scope of the invention.

We claim:

1. A method for reducing the scope of a query seeking information about computers of a network, the method comprising:
   (1) examining a query relating to the administration, monitoring, or configuring of one or more computers in the network;
   (2) determining if the query can be satisfied using data from a number of computers which is less than all of the computers in the network; and
   (3) the query can be satisfied using data from the number of computers which is less than all of the computers in the network, then accessing the number of computers which is less than all of the computers in the network; if the query cannot be satisfied using data from the number of computers which is less than all of the computers in the network, then accessing all the computers in the network.

2. The method of claim 1, wherein the determining operation further comprises:
   for each of the one or more computers related to in the query, examining whether the computer belongs to a group of computers, and if so, including the group of computers in the accessing operation.

3. The method of claim 1, wherein the query is a SQL query.

4. The method of claim 1, wherein the network is a wireless network.

5. A system for processing a query, the system comprising:
   a plurality of computer systems, at least one of the systems executing software that
   (1) examines a query relating to the administration, monitoring, or configuring of one or more computers in the network,
   (2) determines if the query can be satisfied using data from a number of computers which is less than all of the computers in the network, and,
   (3) the query can be satisfied using data from the number of computers which is less than all of the computers in the network, then accesses the number of computers which is less than all of the computers in the network, if the query cannot be satisfied using data from the number of computers which is less than all of the computers in the network, then accesses all the computers in the network.

6. The system of claim 5, wherein at least one of the systems executes software that further determines for each of the one or more computers specified in the query whether the computer belongs to a group of computers, and if so, includes the group of computers in the accessing operation.

7. The system of claim 5, wherein the query is a SQL query.

8. The system of claim 5, wherein the network is a wireless network.

9. A method for reducing a scope of a query seeking information about computers in a network, the method comprising:
  (1) examining a query relating to the administration, monitoring, or configuring of one or more computers in the network;
  (2) determining if the query can be satisfied using data from a number of computers which is less than all of the computers in the network;
  (3) generating a limited list of computers if the query can be satisfied using data from the number of computers which is less than all of the computers in the network, wherein the limited list of computers identifying the number of computers which is less than all of the computers in the network that yield a complete result to satisfy the query;
  (4) accessing the number of computers, identified in the limited list of computers, which is less than all of the computers in the network; and
  if the query cannot be satisfied using data from the number of computers, identified in the limited list of computers, which is less than all of the computers in the network, then accessing all the computers in the network.

10. A tangible computer readable storage medium for storing instructions for processing a scope of a query seeking information about computers, by:
  (3) examining a query relating to the administration, monitoring, or configuring of one or more computers in the network;
  (2) determining if the query can be satisfied using data from a number of computers which is less than all of the computers in the network;
  (3) generating a limited list of computers if the query can be satisfied using data from the number of computers which is less than all of the computers in the network, wherein the limited list of computers identifying the number of computers which is less than all of the computers in the network that yield a complete result to satisfy the query;
  (4) accessing the number of computers, identified in the limited list of computers, which is less than all of the computers in the network; and
  if the query cannot be satisfied using data from the number of computers, identified in the limited list of computers, which is less than all of the computers in the network, then accessing all the computers in the network.

* * * * *

UNITED STATES PATENT AND TRADEMARK OFFICE
CERTIFICATE OF CORRECTION

PATENT NO. : 7,185,006 B2  
APPLICATION NO. : 10/251876  
DATED : February 27, 2007  
INVENTOR(S) : Daniel W. Hepner et al.

Page 1 of 1

It is certified that error appears in the above-identified patent and that said Letters Patent is hereby corrected as shown below:

In column 10, line 24, in Claim 1, after "(3)" insert -- if --.

In column 10, line 53, in Claim 5, after "(3)" insert -- if --.

In column 12, line 4, in Claim 10, delete "(3)" and insert -- (1) --, therefor.

Signed and Sealed this

Eighth Day of December, 2009

David J. Kappos
*Director of the United States Patent and Trademark Office*